(12) United States Patent
Gonzalez Alemany et al.

(10) Patent No.: US 8,342,310 B2
(45) Date of Patent: Jan. 1, 2013

(54) CONVEYOR SYSTEM FOR THE TRANSPORTATION OF PASSENGERS/GOODS

(75) Inventors: Miguel Angel Gonzalez Alemany, Oviedo (ES); Enrique Gonzalez Fernandez, Gijon (ES)

(73) Assignees: Thyssenkrupp Elevator Innovation Center, S.A., Gijon, Asturias (ES); Thyssenkrupp Elevator (ES/PBB) GmbH, Essen (DE)

( * ) Notice: Subject to any disclaimer, the term of this patent is extended or adjusted under 35 U.S.C. 154(b) by 73 days.

(21) Appl. No.: 12/823,801

(22) Filed: Jun. 25, 2010

(65) Prior Publication Data

US 2010/0326791 A1 Dec. 30, 2010

(30) Foreign Application Priority Data

Jun. 26, 2009 (ES) .................................. 200930362

(51) Int. Cl.
*B65G 47/66* (2006.01)
(52) U.S. Cl. ........................................ 198/324; 198/321

(58) Field of Classification Search .................. 198/321, 198/324, 326
See application file for complete search history.

(56) References Cited

U.S. PATENT DOCUMENTS

| 815,834 | A | * | 3/1906 | Hutchinson | 198/321 |
|---|---|---|---|---|---|
| 4,071,135 | A | * | 1/1978 | Ishikawa et al. | 198/324 |
| 4,828,099 | A | * | 5/1989 | Dexter, Jr. | 198/324 |
| 4,964,496 | A | * | 10/1990 | Dexter, Jr. | 198/324 |
| 5,996,767 | A | * | 12/1999 | Misawa | 198/321 |
| 6,342,768 | B1 | * | 1/2002 | van der Heiden | 198/321 |

* cited by examiner

*Primary Examiner* — James R Bidwell
(74) *Attorney, Agent, or Firm* — Merchant & Gould P.C.

(57) ABSTRACT

Conveyor system for the transportation of passengers (21)/goods (22) formed by a bearing structure (1*a*), a loading/unloading area (1*b*) and a traction equipment (4*a*, 19, 20), which also comprises mobile platforms (3, 6, 7, 8, 16, 26) dragged by the traction equipment (4*a*, 19, 20), for the reception and transport of passengers (21)/goods (22) from a loading area to an unloading area. The mobile platforms (3, 6, 7, 8, 16, 26) have side walls (25) to define a compartment and prevent passengers (21)/goods (22) from interfering with the guiding device (4*b*) thereof in a carryway, from a loading area (1*b*) to an unloading area (1*b*), and in a return way, from an unloading area (1*b*) to a loading area (1*b*).

9 Claims, 4 Drawing Sheets

CONVEYOR SYSTEM FOR THE TRANSPORTATION OF PASSENGERS/GOODS

This application claims benefit of Serial No. 200930362, filed 26 Jun. 2009 in Spain and which applications are incorporated herein by reference. To the extent appropriate, a claim of priority is made to the above disclosed application.

FIELD OF THE INVENTION

The invention refers to conveyor systems for the transportation of passengers/goods. Particularly, it refers to a universal conveyor system for people, that is, accessible for all types of passengers, given the limitations of moving walkways and escalators as regards difficulty of access for certain users and the risks inherent to the configuration of said systems.

BACKGROUND OF THE INVENTION

Within the market of escalators, there are known the limitations of use by handicapped people or people with limited mobility/very young people or people who transport heavy objects. This type of users of the conveyor system object of the invention represents today a growing percentage.

Nowadays, these known limitations are solved with the combination of escalators with vertical elevation equipment such as elevators, or discontinuous displacement individual platforms, or with escalators the operation of which is interrupted so as to be able to increase the support surface through the horizontal combination of steps. These already proven solutions have different inconveniences among which we can mention the complexity of the civil construction of the elevator/escalator assembly, or the dependence on qualified operators in the case of individual platforms.

DESCRIPTION OF THE INVENTION

The invention refers to a conveyor system for the transportation of people/goods, which comprises a platform mounted on lateral supports which move through guides which are in turn mounted on a bearing structure. This platform describes a closed and continuous movement, point by point, without intermediate stops, reversible, activated by a traction equipment which can be an equipment with mechanic traction.

The conveyor system can be applied to different types of unevenness, such as those where the unevenness between the loading and unloading areas is substantial, and also those where the unevenness is smaller or even non-existent.

The system can operate continuously, in periods with a high flow of passengers and also intermittently, when the flow of passengers decreases, so that energy use is optimized and the life of the system is extended.

Also, it is possible to include auxiliary doors in the loading/unloading areas as an additional security measure, in installation and maintenance tasks.

The system can also to include energy accumulation equipment in the downward movement of the mobile platform. The platforms can be provided with batteries which allow its autonomous operation.

The invention improves the accessibility and transport of escalators, ramps and moving walkways, and it also mitigates the risks inherent to those systems. The main characteristics of the invention are the following:

Universal accessible system for all people.
Reduction of possible contacts between users in movement and fixed parts.
Protection against falls.
Continuous displacement and point by point system, that is, without intermediate stations.

The conveyor system of the invention comprises several subsystems. Firstly, it has a bearing structure to absorb the different loads transmitted by the platforms and the different elements forming the traction equipment, as well as the electric equipment. The handrail is mounted upon this bearing structure, to prevent the access of people from outside.

The accessible mobile platform comprises a compartment formed by the floor and fixed or mobile side walls designed to facilitate the storage of the mobile platforms under the loading and unloading areas. These storages or buffer enable to have a surplus of platforms to maintain the continuity of the system, and at the same time they enable to save energy as they prevent the continuous circulation of empty platforms when there is no demand.

In turn, the platform has doors for goods/passenger protection against falls forwards or backwards integrated in its front walls. The opening and closing of these doors is described below. The mobile platform can also include handrails at the sides to increase passenger safety and comfort.

The floor of the mobile platform has grooves to facilitate the transition of the platforms under the loading and unloading areas which are fixed.

Integral supports to the mobile platform can slide on a guiding device mounted on supports joined to the bearing structure. The arrangement thereof allows the horizontal rising of the mobile platform.

On the other hand, the movement of the mobile platforms can be carried out by an individual traction equipment of each platform or it can be a common drag system for the set of mobile platforms.

The loading and unloading areas consist of an area for passenger entrance to and exit from the mobile platform. These loading and unloading areas have side fairings at both sides which hide, in each case, the entrance/exit of the mobile platform. With these fairings the user is protected against contact with internal areas of the system located between the loading and unloading areas. Under the loading and unloading areas there can be located the mobile platform storage area.

As regards the command equipment, it can comprise a manual and individual activation inside each platform and it can be activated by a button. The equipment can in turn have an automatic activation located in the loading/unloading areas and in the mobile platform, to enable an automatic opening/closing of the doors in the mobile platform, taking into account the presence conditions in these areas. The operation mechanism of the doors can be chosen among multiple expansion/retraction devices, such as folding, hinged, collapsible, among others. The doors can be incorporated into platforms, in the bearing structure or in both elements.

As regards the control means, they can be centralized in a piece of equipment where all the information sent from the platforms and auxiliary elements by wired or wireless means is controlled and processed, or the control means can be control means individually distributed in each platform. With these means it is possible to attain a system which works according to the pre-established control logics.

As regards the safety equipment, they comprise presence sensors in risk areas to protect the user from any kind of contact with unauthorized elements of the system, automatically causing the stop of the equipment.

An aspect of the invention refers to a conveyor system for the transportation of passengers/goods as the one defined in the set of claims.

BRIEF DESCRIPTION OF THE DRAWINGS

The following is a brief description of a series of drawings which will help understand the invention better relating to an embodiment of said invention which is presented as a non-limiting example thereof.

Figure 1:
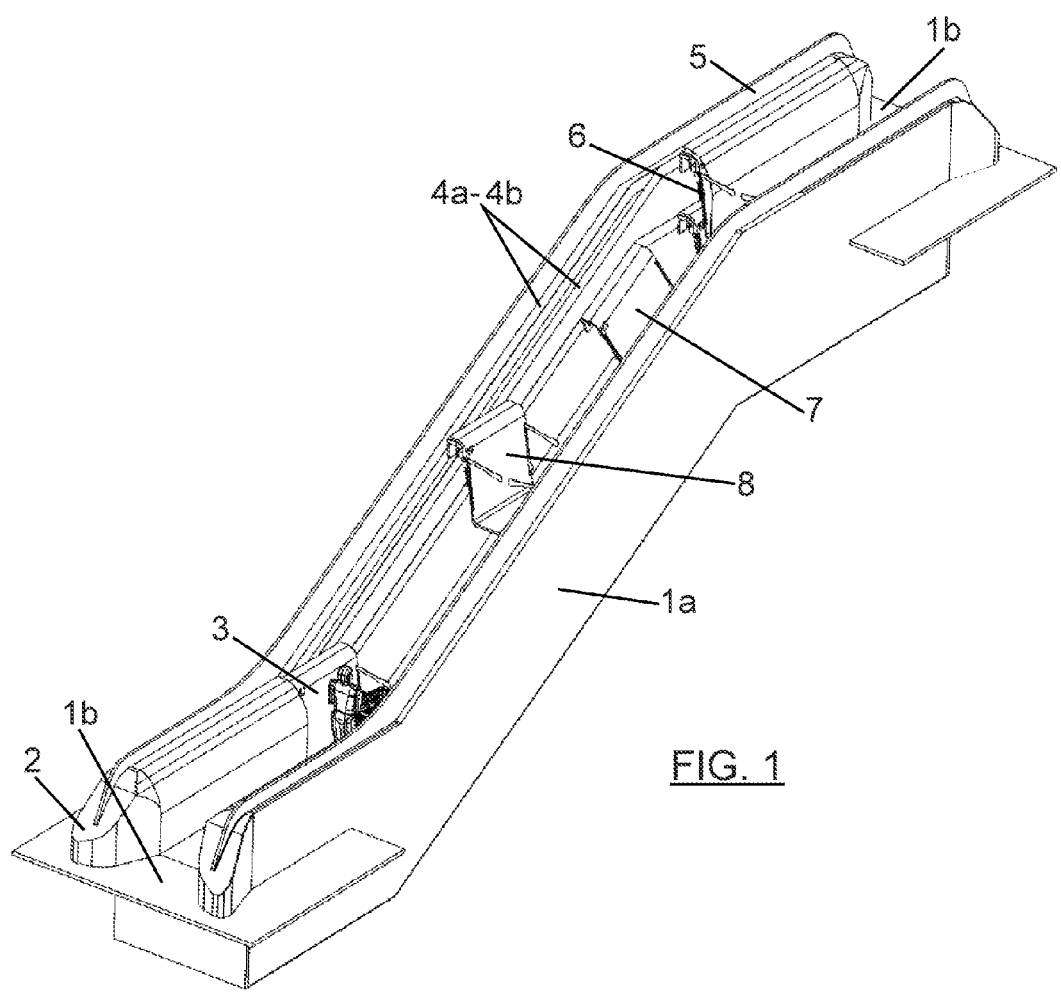
FIG. 1 shows a perspective view of the system of the invention.
Figure 2:
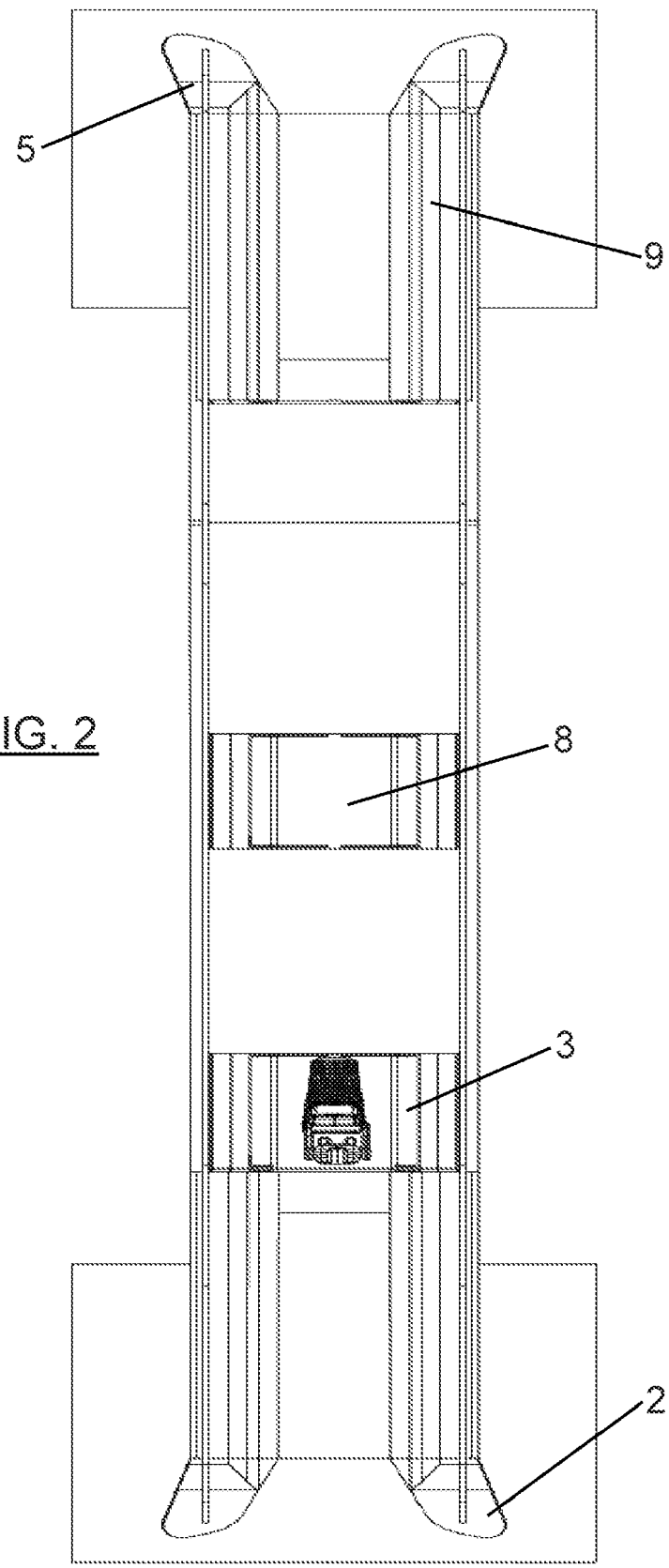
FIG. 2 shows an upper view of the system of the invention.
Figure 3:
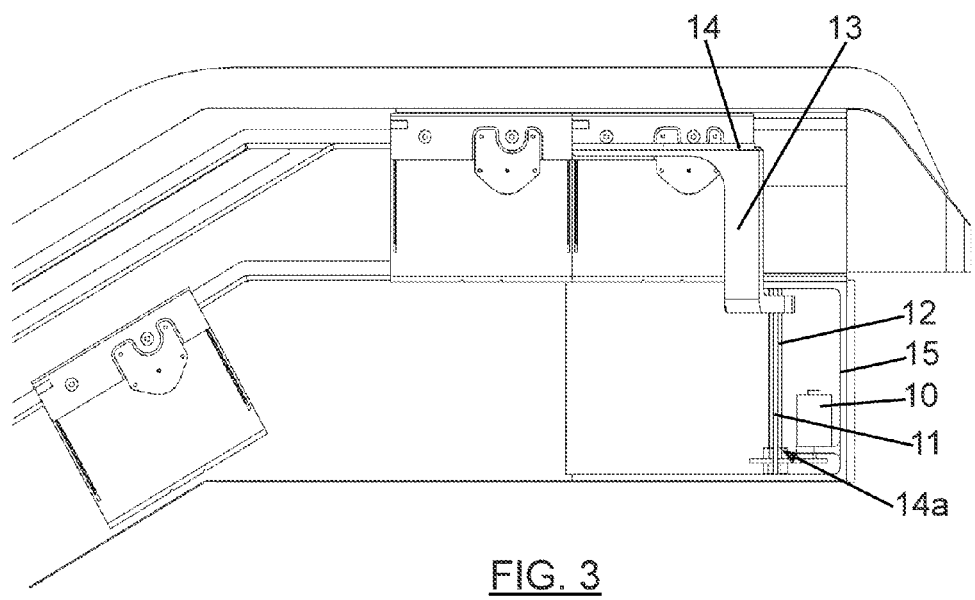
FIG. 3 shows a lateral view of the elevation system with the frame at the carryway level.
Figure 4:
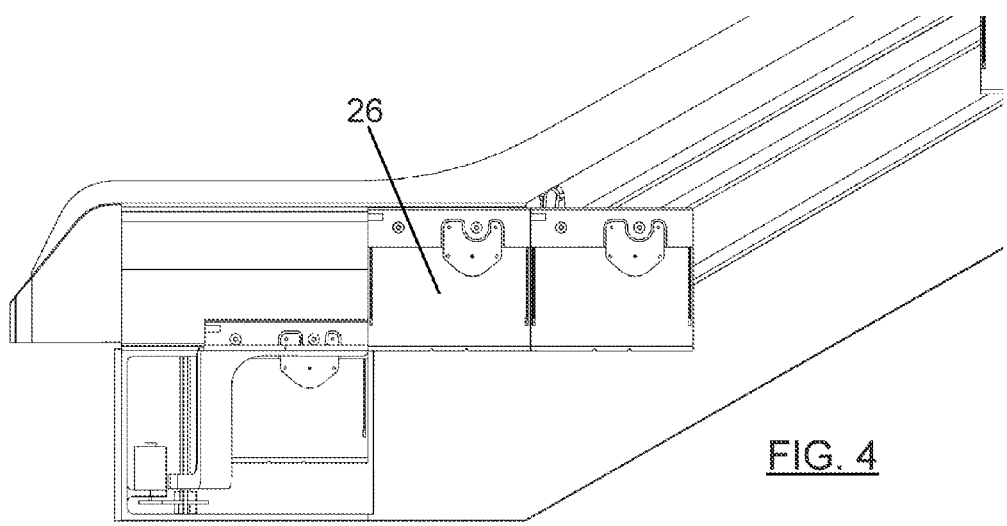
FIG. 4 shows a lateral view of the elevation system with the frame at the return level.
Figure 5:
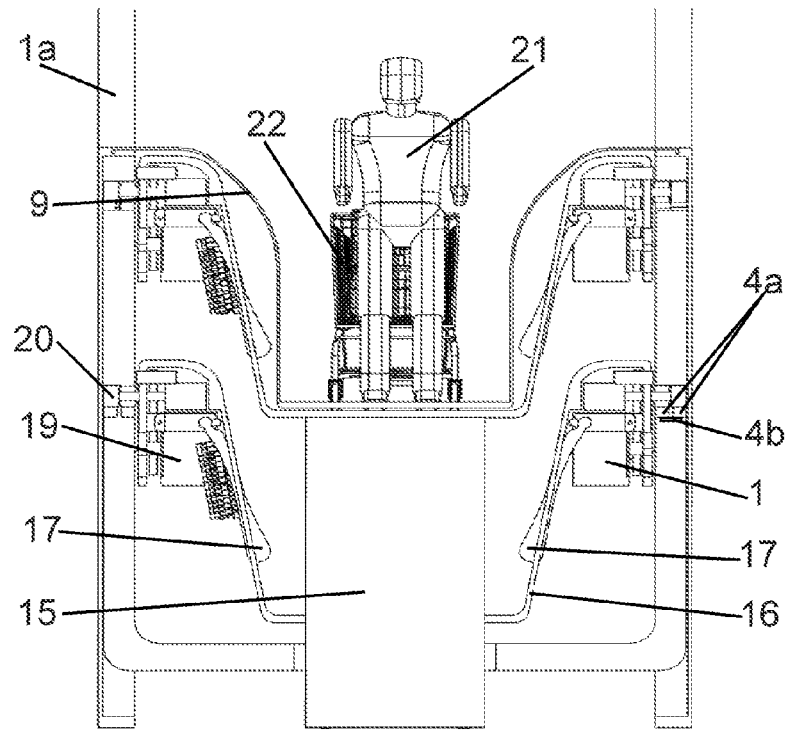
FIG. 5 shows a rear view of the loading area with the displacement means.
Figure 6:
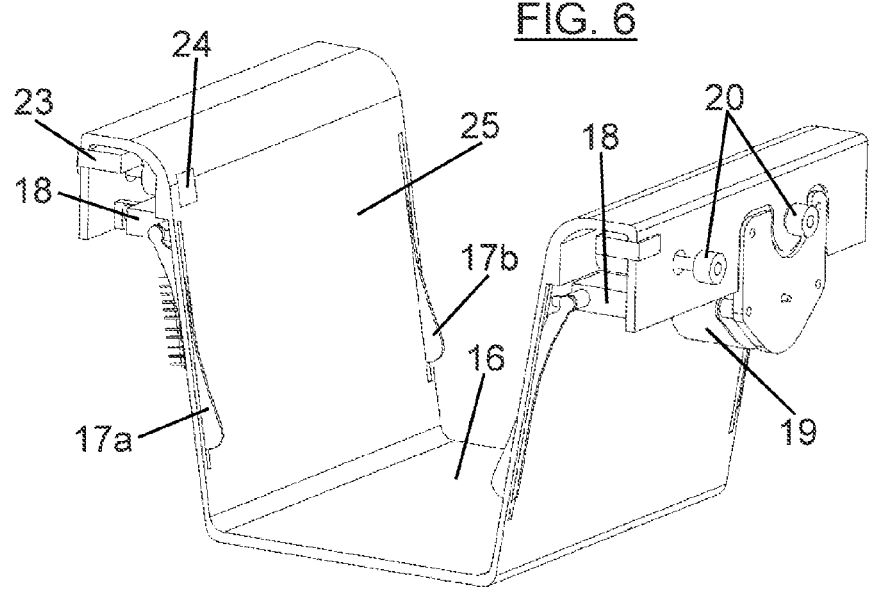
FIG. 6 shows a perspective view of a mobile platform.

DESCRIPTION OF A PREFERRED
EMBODIMENT OF THE INVENTION

Now following, an embodiment of a working cycle of the system is described, indicating the different states both of the user and of the platform.

State 1:

1.1) The user reaches the loading area and finds a mobile platform (3, 16) located next to the loading area with the front doors closed to avoid the user's access to an unauthorized area of the system. This mobile platform (3, 16) is in a waiting position.

1.2) When the user enters the mobile platform in a waiting position (3, 16), it is activated manually or automatically: the rear doors are closed and the movement starts from the loading area to the unloading area.

1.3) Another mobile platform (26, 16), in hidden pre-entrance position, is located in a position before the mobile platform in a waiting position (3, 16); while the rear doors of the mobile platform in a waiting position (3, 16) are closed, the front doors of the mobile platform in pre-entrance position (26, 16) are closed. When the mobile platform in a waiting position (3, 16) leaves its position when the movement starts from the loading area, the mobile platform in pre-entrance position (26, 16) occupies this position, passing from the pre-entrance position to the waiting position.

State 2:

2.1) The user onboard a mobile platform (8, 16) in transport position reaches the unloading area.

2.2) The mobile platform in transport position (8, 16) is located right after a mobile platform (6, 16) in blocking position in the unloading area.

2.3) Later, the rear doors of the mobile platform in blocking position (6, 16) and the front doors of the mobile platform in transport position (8, 16) open.

State 3:

3.1) Once the rear doors of the mobile platform in blocking position (6, 16) and the front doors of the mobile platform in transport position (8, 16) open, both mobile platforms advance simultaneously.

3.2) The mobile platform in transport position (8, 16) occupies the blocking position, going from the transport position to the blocking position. The mobile platform in transport position (8, 16) with the rear doors closed occupies its blocking position under the comb plate constituting the unloading area.

3.3) The mobile platform in blocking position (6, 16) advances under the comb plate constituting the unloading area up to the displacement means (10, 11, 12, 13, 14, 15). In the displacement means (10, 11, 12, 13, 14, 15), the platform in blocking position (6, 16) is displaced from a carryway level to a return level to start a return way through the guides.

1. An embodiment of the invention refers to a conveyor system for the transportation of passengers (21)/goods (22) comprising:
   1a) a bearing structure (1*a*);
   1b) a loading/unloading area (1*b*);
   1c) a traction equipment (4*a*, 19, 20);
   The conveyor system comprises:
   1d) a plurality of mobile platforms (3, 6, 7, 8, 16, 26):
     1d1) dragged by the traction equipment (4*a*, 19, 20), configured to receive and convey passengers (21)/goods (22) in a carryway, from a loading area to an unloading area;
     1d2) comprising side walls (25) to define a compartment and prevent the passengers (21)/goods (22) from interfering with the guiding device (4*b*); these side walls (25) can be fixed, mobiles, collapsible, folding in order to facilitate the storage of the mobile platforms (3, 6, 7, 8, 16, 26) and the space in the return way;
   1e) a guiding device (4*b*) configured to guide the mobile platform (3, 6, 7, 8, 16, 26):
     1e1) in a carryway, from a loading area (1*b*) to an unloading area (1*b*)
     1e2) in a return way, from an unloading area (1*b*) to a loading area (1*b*).

When reference is made to the loading/unloading areas (1*b*), both areas are indicated in the same way as the system is reversible: working in a first direction, there is a first loading area and a first unloading area; when it works in a second direction, opposite the first direction, the first loading area is the second unloading area and the first unloading area is the second loading area. These loading/unloading areas (1*b*) can be covered by fairings (9) to avoid interferences of the passengers (21)/goods (22) with unauthorized areas of the system. FIG. 1 also shows the entrance (2) and an ornamental glass panel (5) along the entire length of said structure.

Other characteristics of the invention are included below:

2. In the conveyor system:
   2a) the mobile platform (3, 6, 7, 8, 16, 26) comprises connection means which have a shape which fits the guiding device (4*b*);
   2b) the guiding device (4*b*) comprises lateral guides located at both sides of the mobile platform (3, 6, 7, 8, 16, 26). These lateral guides can be placed symmetrically with respect to a medium longitudinal plane perpendicular to the mobile platform (3, 6, 7, 8, 16, 26). Other guiding systems can comprise a guided linear motor traction system or a system of rollers dragged by chain or a guide system dragged by cable or T-shaped guide system.

The mobile platform (3, 6, 7, 8, 16, 26) can comprise a command console (24) to enable a passenger (21) to order the movement start. Additionally, the mobile platform (3, 6, 7, 8, 16, 26) can comprise position sensors (23) to know the position of each platform in the system.

3. The conveyor system also comprises displacement means (10, 11, 12, 13, 14, 15) in the loading/unloading areas (1*b*) to position the return mobile platform (7, 16) between a carryway level and a return level.

4. The displacement means (10, 11, 12, 13, 14) comprise:

4a) an elevation/descent frame (13) to receive a return mobile platform (7, 16) in a loading/unloading area (1b) and displace the return mobile platform (7, 16) between the carryway level and the return level;

4b) an auxiliary guiding device (14) in the elevation/descent frame (13) to guide the entrance/exit from the return mobile platform (7, 16) on the elevation/descent frame (13);

4c) a spindle (11) to vertically displace the elevation/descent frame (13) between the carryway and return levels according to the rotation direction of the spindle (11);

4d) centering guides (12) to guide the vertical movement of the elevation/descent frame (13) between the carryway and return levels;

4e) an elevation/descent engine (10) to activate the spindle (11).

The displacement means (10, 11, 12, 13, 14) are mounted on a support (15) connected to loading/unloading areas (1b). It can also incorporate a level position sensor (14a) of the elevation/descent frame (13).

The displacement means (10, 11, 12, 13, 14) can comprise a mechanical elevation system such as the one described or alternative solutions. A bucket chain-type system, where the return platforms (7, 16) keep the horizontality and are displaced with a curved movement between the carryway level and the return level through lateral wheels comprising a plurality of housings configured to receive support points installed in the return mobile platform (7, 16), constituting the mobile platforms (7, 16) the buckets of said bucket chain-like system.

Another system can be formed by a combination of guides and needles which guide the return mobile platform (7, 16) along a closed way between the carryway level and the return level.

At the return level there can be included storages of return mobile platforms (7, 16). These storages can be of the turret type, or else they can have the return mobile platforms (7, 16) vertically nested or longitudinally nested in the return way. These storages can be located in the loading/unloading areas (1b) to secure a stock of return mobile platforms (7, 16).

Another displacement means can comprise a horizontal displacement equipment of platforms which are moved from the unloading area of the carryway to the loading area of the return way located in parallel, not in different levels. In this way, both ways, the carryway and the return way, are harnessed to transport passengers (21)/goods (22).

5. In the conveyor system, an element selected between the bearing structure (1a), the mobile platform (3, 6, 7, 8, 16, 26) and combinations thereof comprises:

5a) front doors (17b) and rear doors (17a) configured to complement the compartment:

5a1) avoiding a fall of the passengers (21)/goods (22) from a mobile platform in transport position (8, 16) during the carryway from the loading area (1b) to the unloading area (1b);

5a2) allowing access of the passengers (21)/goods (22) to a mobile platform in waiting position (3, 16) from the loading area (1b);

5a3) allowing the exit of the passengers (21)/goods (22) from a mobile platform in blocking position (6, 16) to the unloading area (1b);

5b) opening/closing means (18) to move the front doors (17b) and rear doors (17a) between an open position and a closed position;

5b1) the front doors (17b) and rear doors (17a) of a mobile platform in transport position (8, 16) being closed;

5b2) the front doors (17b) of a mobile platform in waiting position (3, 16) being closed;

5b3) the rear doors (17a) of a mobile platform in waiting position (3, 16) being open;

5b4) the rear doors (17a) of a mobile platform in blocking position (6, 16) being closed;

5b5) the front doors (17b) of a mobile platform in blocking position (6, 16) being open;

5b6) the front doors (17b) and rear doors (17a) of a return mobile platform (7, 16) being open in the return way from the unloading area (1b) to the loading area (1b);

If the front doors (17b) and rear doors (17a) come from the bearing structure (1a), this optimizes the space needed to carry out the platform displacements in the storage and in the return way.

6. In the conveyor system:

6a) the mobile platform in waiting position (3, 16) is activated once the passengers (21)/goods (22) have accessed the mobile platform in waiting position (3, 16);

6b) the rear doors (17a) of a mobile platform in waiting position (3, 16) are closed;

6c) the front doors (17b) of a mobile platform in hidden pre-entrance position (26, 16) are closed; the closing of the front doors (17b) of a mobile platform in hidden pre-entrance position (26, 16) can occur while the rear doors (17a) of a mobile platform in waiting position (3, 16) are closed;

6d) the mobile platform in waiting position (3, 16) which has the front doors (17b) and the rear doors (17a) closed is displaced from the entrance/loading area to the unloading area;

6e) the mobile platform in hidden pre-entrance position (26, 16) is displaced simultaneously to the mobile platform in waiting position (3, 16), from the pre-entrance position to the waiting position;

6f) the mobile platform in transport position (8, 16) gets close to the unloading area and is located behind a mobile platform in blocking position (6, 16);

6g) the mobile platform in transport position (8, 16) stops behind the mobile platform in blocking position (6, 16);

6h) the rear doors (17a) of the mobile platform in blocking position (6, 16) and the front doors (17b) of the mobile platform in transport position (8, 16) are opened;

6i) the mobile platform in blocking position (6, 16) and the mobile platform in transport position (8, 16) are simultaneously displaced;

6j) the mobile platform in transport position (8, 16) is displaced to the blocking position; 6k) the mobile platform in blocking position (6, 16) is displaced to the elevation/descent frame (13);

6l) the mobile platform in blocking position (6, 16) is displaced by the elevation/descent frame (13) to the return level;

6m) the return mobile platform (7, 16) is displaced through the return way to the elevation/descent frame (13) in a start position in the loading area;

6n) the return mobile platform (7, 16) is displaced by the elevation/descent frame (13) to the carryway level in a hidden pre-waiting position to start a new cycle.

7. The front doors (17b) and rear doors (17a) are moved by opening/closing means (18) in a direction selected between upward/downward, collapsible, mobile and combinations thereof.

The front doors (17b) and rear doors (17a) can form a compartment at the contour of the mobile platform in transport position (8, 16). The movement of the doors can occur inside the mobile platform (3, 6, 7, 8, 16, 26) or from the bearing structure (1a). If the front doors (17b) and rear doors (17a) are located in the mobile platform (3, 6, 7, 8, 16, 26), the front doors (17b) and rear doors (17a) can be displaced from a location selected between the floor, the side walls and combinations thereof.

8. The opening/closing means (18) comprise activation means selected between manual, automatic and combinations thereof. The activation means can comprise presence detectors.

9. The traction equipment (4a, 19, 20) is selected between:
  9a) traction electric motor (19) with gearbox activating pinions (20) mounted in the mobile platform (3, 6, 7, 8, 16, 26), engaging the pinions (20) on racks (4a) mounted on guides (4b) of the bearing structure (1a);
  9b) electric motor with gearbox activating rollers mounted on the mobile platform (3, 6, 7, 8, 16, 26), the rollers rolling on guides mounted on the bearing structure (1a);
  9c) induction motor;
  9d) cable drag chain system;
  9e) roller chain system;
  9f) self-guided linear motor;
  9g) magnetic motor;
  and combinations thereof.

10. The conveyor system also comprises an energy supply system for the platform selected between:
  10a) a pantograph equipment in each platform and rails in the bearing structure (1a);
  10b) an induction equipment in each platform and a conductor in the bearing structure (1a);
  10c) an energy accumulation equipment to receive energy from the return platform (7, 16);
  and combinations thereof.

11. The conveyor system also comprises a rescue system comprising:
  11a) an autonomous energy supply piece of equipment configured to start working when there is a deficiency of energy supply and displace the platforms up to rescue positions.

The rescue system enables to evacuate the passengers (21)/goods (22) and return to an initial state of the system.

The invention claimed is:

1. Conveyor system for the transportation of passengers/goods, the system comprising:
  a bearing structure;
  a loading/unloading area;
  a traction equipment;
  a plurality of mobile platforms:
    dragged by the traction equipment, configured to receive and convey passengers/goods in a carryway, from a loading area to an unloading area;
    comprising side walls to define a compartment and prevent the passengers/goods from interfering with a guiding device;
  wherein the guiding device is configured to guide the mobile platform:
    in a carryway, from the loading area to the unloading area
    in a return way, from the unloading area to the loading area;
  displacement means in the loading/unloading area to position a return mobile platform between a carryway level and a return level; wherein the displacement means comprise:
    an elevation/descent frame to receive the return mobile platform in the loading/unloading area and displace the return mobile platform between the carryway level and the return level;
    an auxiliary guiding device in the elevation/descent frame to guide an entrance/exit from the return mobile platform on the elevation/descent frame;
    a spindle to vertically displace the elevation/descent frame between the carryway level and the and return level according to a rotation direction of the spindle;
    centering guides to guide vertical movement of the elevation/descent frame between the carryway level and the return level;
    an elevation/descent engine to activate the spindle.

2. The conveyor system for the transportation of passengers/goods according to claim 1 wherein:
  the mobile platform comprises connection means which have a shape which fits the guiding device;
  the guiding device comprises lateral guides located at both sides of the mobile platform.

3. The conveyor system for the transportation of passengers/goods according to claim 1 wherein an element selected between the bearing structure, the mobile platform and combinations thereof comprises:
  front doors and rear doors configured to complement the compartment:
    avoiding a fall of the passengers/goods from a mobile platform in transport position during the carryway from the loading area to the unloading area;
    allowing access of the passengers/goods to a mobile platform in waiting position from the loading area;
    allowing the exit of the passengers goods passengers/goods from a mobile platform in blocking position to the unloading area;
  opening/closing means to move the front doors and rear doors between an open position and a closed position;
  the front doors and rear doors of a mobile platform in transport position being closed;
  the front doors of a mobile platform in waiting position being closed;
  the rear doors of a mobile platform in waiting position being open;
  the rear doors of a mobile platform in blocking position being closed;
  the front doors of a mobile platform in blocking position being open;
  the front doors and rear doors of a return mobile platform being open in the return way from the unloading area to the loading area.

4. The conveyor system for the transportation of passengers/goods according to claim 3 wherein:
  the mobile platform in waiting position is activated once the passengers/goods have accessed the mobile platform in waiting position;
  the rear doors of a mobile platform in waiting position are closed;
  the front doors of a mobile platform in hidden pre-entrance position are closed;
  the mobile platform in waiting position which has the front doors and the rear doors closed is displaced from the entrance/loading area to the unloading area;
  the mobile platform in hidden pre-entrance position is displaced simultaneously to the mobile platform in waiting position, from the pre-entrance position to the waiting position;

the mobile platform in transport position gets close to the unloading area and is located behind a mobile platform in blocking position;

the mobile platform in transport position stops behind the mobile platform in blocking position;

the rear doors of the mobile platform in blocking position and the front doors of the mobile platform in transport position are opened;

the mobile platform in blocking position and the mobile platform in transport position are simultaneously displaced;

the mobile platform in transport position is displaced to the blocking position; the mobile platform in blocking position is displaced to the elevation/descent frame;

the mobile platform in blocking position is displaced by the elevation/descent frame to the return level;

the return mobile platform is displaced through the return way to the elevation/descent frame in a start position in the loading area;

the return mobile platform is displaced by the elevation/descent frame to the carryway level in a hidden pre-waiting position to start a new cycle.

5. The conveyor system for the transportation of passengers/goods according to claim 3, wherein the front doors and rear doors are moved by opening/closing means in a direction selected between upward/downward, collapsible, mobile and combinations thereof.

6. The conveyor system for the transportation of passengers/goods according to claim 3, wherein the opening/closing means comprise activation means selected between manual, automatic and combinations thereof.

7. Conveyor system for the transportation of passengers/goods, the system comprising:
   a bearing structure;
   a loading/unloading area;
   a traction equipment;
   a guiding device configured to guide the mobile platform:
      in a carryway, from a loading area to an unloading area, and
      in a return way, from the unloading area to the loading area;
   a plurality of mobile platforms dragged by the traction equipment and configured to receive and convey the passengers/goods in the carryway, from the loading area to the unloading area, the mobile platforms comprising side walls to define a compartment and prevent the passengers/goods from interfering with the guiding device;
   wherein the traction equipment is selected among:
   traction electric motor with gearbox activating pinions mounted in the mobile platform, engaging the pinions on racks mounted on guides of the bearing structure;
   electric motor with gearbox activating rollers mounted on the mobile platform, the rollers rolling on guides mounted on the bearing structure;
   induction motor;
   cable drag chain system;
   roller chain system;
   self-guided linear motor;
   magnetic motor;
   and combinations thereof.

8. Conveyor system for the transportation of passengers/goods, the system comprising:
   a bearing structure;
   a loading/unloading area;
   a traction equipment;
   a guiding device configured to guide the mobile platform:
      in a carryway, from a loading area to an unloading area, and
      in a return way, from the unloading area to the loading area;
   a plurality of mobile platforms dragged by the traction equipment and configured to receive and convey the passengers/goods in the carryway, from the loading area to the unloading area, the mobile platforms comprising side walls to define a compartment and prevent the passengers/goods from interfering with the guiding device;
   an energy supply system for the platform selected among:
   a pantograph equipment in each platform and rails in the bearing structure;
   an induction equipment in each platform and a conductor in the bearing structure;
   an energy accumulation equipment to receive energy from the return platform;
   and combinations thereof.

9. Conveyor system for the transportation of passengers/goods, the system comprising:
   a bearing structure;
   a loading/unloading area;
   a traction equipment;
   a guiding device configured to guide the mobile platform:
      in a carryway, from a loading area to an unloading area, and
      in a return way, from the unloading area to the loading area;
   a plurality of mobile platforms dragged by the traction equipment and configured to receive and convey the passengers/goods in the carryway, from the loading area to the unloading area, the mobile platforms comprising side walls to define a compartment and prevent the passengers/goods from interfering with the guiding device;
   a rescue system comprising:
   an autonomous energy supply piece of equipment configured to start working when there is a deficiency of energy supply and displace the platforms to rescue positions.

* * * * *